US009448785B1

(12) United States Patent
Alexeev et al.

(10) Patent No.: US 9,448,785 B1
(45) Date of Patent: Sep. 20, 2016

(54) SYSTEM AND METHOD UPDATING FULL DISK ENCRYPTION SOFTWARE

(71) Applicant: AO Kaspersky Lab, Moscow (RU)

(72) Inventors: Vitaly S. Alexeev, Moscow (RU); Dmitry V. Bavykin, Moscow (RU); Alexander V. Fedorov, Moscow (RU); Evgeny A. Gleyzerman, Moscow (RU); Alexey V. Ilyushin, Moscow (RU); Lev A. Kazarkin, Moscow (RU); Evgeniya P. Kirikova, Moscow (RU); Alexey A. Kutumov, Moscow (RU); Gleb Y. Molaev, Moscow (RU); Ilya A. Tereshchenko, Moscow (RU); Evgeny A. Yakovlev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/934,456

(22) Filed: Nov. 6, 2015

(51) Int. Cl.
*G06F 9/44* (2006.01)
*G06F 9/445* (2006.01)
*G06F 21/57* (2013.01)

(52) U.S. Cl.
CPC . *G06F 8/65* (2013.01); *G06F 8/61* (2013.01); *G06F 21/572* (2013.01)

(58) Field of Classification Search
CPC ................................ G06F 21/572; G06F 8/65
USPC .......................................... 717/168; 713/191
See application file for complete search history.

(56) References Cited

U.S. PATENT DOCUMENTS

| | | | |
|---|---|---|---|
| 6,249,866 B1* | 6/2001 | Brundrett | G06F 12/1408 380/286 |
| 7,584,467 B2 | 9/2009 | Wickham et al. | |
| 8,555,059 B2* | 10/2013 | McKelvey | G06F 21/46 713/165 |
| 9,003,176 B1 | 4/2015 | Yakovlev | |
| 2009/0138728 A1* | 5/2009 | Fujiwara | G06F 21/123 713/193 |
| 2009/0204806 A1* | 8/2009 | Kanemura | G06F 21/10 713/155 |
| 2010/0180343 A1* | 7/2010 | Maeda | G06F 21/57 726/23 |

OTHER PUBLICATIONS

Balogh et al., "Capturing Encryption keys for Digital Analysis", 2011.*
Blass et al., "Tresor-Hunt: Attacking CPU-Bound Encryption", 2012.*

* cited by examiner

*Primary Examiner* — Phillip H Nguyen
(74) *Attorney, Agent, or Firm* — Arent Fox LLP; Michael Fainberg

(57) ABSTRACT

Disclosed are systems and method or updating full disk encryption (FDE) software on a computer. An example method comprises: blocking operations of the FDE software on a boot drive of the computer; installing one or more components of the updated FDE software; deploying an updated pre-boot compatibility verification component of updated FDE software; rebooting the computer and executing, before booting of an operating system, the updated pre-boot compatibility verification component; determining, by the updated pre-boot compatibility verification component, a compatibility of the boot disk with the updated FDE software without decrypting and encrypting the boot disk of the computer by the updated FDE software; if the boot disk is determined to be compatible with the updated FDE software, authenticating a computer user and booting the operating system of the computer; and unblocking one or more operations of the updated FDE software on the boot drive.

20 Claims, 5 Drawing Sheets

SYSTEM AND METHOD UPDATING FULL DISK ENCRYPTION SOFTWARE

FIELD OF TECHNOLOGY

The present disclosure related generally to the field of computer security and, more particularly, to systems and methods of updating full disk encryption (FDE) software.

BACKGROUND

One of the most popular methods of protection of confidential data is using encryption of this data. Encryption of data in the general case is a reversible transformation of information for purposes of concealing it from unauthorized persons, while at the same time providing authorized persons with access to it. There are many different methods of data encryption.

File encryption is an encryption applied only to specific files on a computer disk. It is easier and faster to employ, but it has its drawbacks. For example, encrypted files can be copied and decrypted by hacking the encryption key. Programs which use encrypted files may store the decrypted files in cache, and also the original file after the encryption is removed from the disk, but it can be restored from deleted files using, e.g., programs of the "undelete" family.

Full disk encryption (FDE) is an encryption of a disk in its entirety, along with its logical structure (e.g., logical partitions, master user account). In the case of FDE, the data, which is copied from the encrypted disk to another storage medium, is transformed into the decrypted (original) form. However, the saving of all data on an encrypted disk is a safer approach of ensuring the confidentiality of the user's data in cases when the user loses the device.

Many different FDE solutions on the market. The best known are the specialized software products: BitLocker, TrueCrypt, PGPDisk and others. Also, more recently, FDE software became part of popular corporate antivirus products, such as Kaspersky Endpoint Security DPE.

Typically, when performing full disk encryption of boot drives, a pre-boot authentication software is installed on the hard disk. This software requires the user to enter a password, after correct entry therefore, the booting of the operating system (OS) occurs. Antivirus software products have their own pre-boot authentication modules. When full disk encryption is applied to a boot drive, the antivirus software changes the sequence of the boot process, inserting the pre-boot authentication module into the normal computer booting process. This module operates at the pre-boot execution stage and uses the interfaces of the basic input/output system (BIOS) or a unified extensible firmware interface (UEFI) to work with the computer hardware. The pre-boot execution stage is a stage in which the computer firmware is initialized, but the booting of the operating system has not yet begun.

In the pre-boot execution stage, interaction with the computer hardware is possible through firmware interfaces. Firmware has its own errors, limitations and problems involving the hardware compatibility of devices. Therefore, the components of an antivirus software operating at this stage can also have various problems of compatibility. If such problems arise, the computer might not start, since the pre-boot authentication module is used for the booting of the OS from the encrypted disk, but it is not compatible with the computer hardware.

Moreover, there is a periodic requirement to update an antivirus application, as well as its components performing the full disk encryption functions. The main problem in updating is that the updated version of the pre-boot authentication module, which is available in the update, is not always compatible with the current (older) version of the pre-boot authentication module, which is already installed on the disk. To avoid problems of compatibility during updating, the antivirus application often performs a complete decryption of the data from the disk, updating of the pre-boot authentication module, and then complete encryption of the user data. Such a method of updating may take long time, limiting the work of the user on the device. Moreover, the user's data is decrypted, which may have negative consequences on its confidentiality.

Therefore, there is a need for solution enabling updating of the FDE software on a boot drive without decrypting and repeated encryption of the data.

SUMMARY

Disclosed are systems and method or updating full disk encryption (FDE) software on a computer. In one exemplary aspect, a method comprises: blocking operations of the FDE software on a boot drive of the computer; installing one or more components of the updated FDE software on the computer; deploying an updated pre-boot compatibility verification component of updated FDE software that checks compatibility of the boot disk with the updated FDE software; rebooting the computer and executing, before booting of an operating system, the updated pre-boot compatibility verification component of the updated FDE software; determining, by the updated pre-boot compatibility verification component of the updated FDE software, a compatibility of the boot disk with the updated FDE software without decrypting and encrypting the boot disk of the computer by the updated FDE software; if the boot disk is determined to be compatible with the updated FDE software, authenticating a computer user and booting the operating system of the computer; and unblocking one or more operations of the updated FDE software on the boot drive of the computer.

In another exemplary aspect, blocking operations of the FDE software includes: blocking operations of encrypting the boot drive of the computer; and blocking operations of decrypting the boot drive of the computer.

In another exemplary aspect, installing one or more components of the updated FDE software further include installing one or more of: an executable file of the updated FDE software, a dynamic link library of the updated FDE software, a driver of the updated FDE software, and one or more resource files of the updated FDE software.

In another exemplary aspect, deploying an updated pre-boot compatibility verification component of updated FDE software, includes one or more of: allocating a continuous block of storage on the boot disk of the computer; copying to the allocated block of storage the updated pre-boot compatibility verification component of the updated FDE software; creating in the allocated block of storage a data structure for storing one or more settings of the updated pre-boot compatibility verification component of the updated FDE software; copying into to the data structure settings of a current FDE software; setting in the data structure a test reboot flag indicating that the next computer reboot is to be performed in a test mode without decrypting and encrypting the boot disk; storing in the data structure a copy of a master boot record of the current FDE software; creating a new master boot record for the updated pre-boot compatibility verification component of the updated FDE software and copying the new master boot record in a zero sector of the boot disk.

In another exemplary aspect, the settings of the current FDE software include at least user authentication data used for decryption of the boot disk.

In another exemplary aspect, during execution, the updated pre-boot compatibility verification component of the updated FDE software checks settings of a test reboot flag in the data structure in order to perform reboot without decrypting and encrypting the boot disk.

In another exemplary aspect, determining a compatibility of the boot disk with the updated FDE software further includes one or more of: determining hardware compatibility of the boot disk with the hardware of the computer; determining transformation of a user authentication data compatible with a current FDE software into a user authentication data compatible with the updated FDE software; determining compliance of the boot disk with encryption policies of the updated FDE software; and determining compliance of the boot disk with security policies of the updated FDE software.

In another exemplary aspect, the method further includes: in case of a failure to load the updated pre-boot compatibility verification component, uninstalling the one or more components of the updated FDE software; and unblocking operations of the FDE software on the computer.

In another exemplary aspect, the method further includes: in case of a failure to boot the operating system of the computer after installing the one or more components of the updated FDE software on the computer, adding to the booting schedule replacement of one or more components of the FDE software with components of old FDE software; modifying the boot process of the computer to assure loading of components of old FDE software; rebooting the computer, executing a pre-boot compatibility verification component of the old FDE software, and booting the operating system; unblocking operations of the old FDE software on the computer.

In another exemplary aspect, a system for updating FDE software on a computer, comprises a hardware processor configured to: block operations of the FDE software on a boot drive of the computer; install one or more components of the updated FDE software on the computer; deploy an updated pre-boot compatibility verification component of updated FDE software that checks compatibility of the boot disk with the updated FDE software; reboot the computer and executing, before booting of an operating system, the updated pre-boot compatibility verification component of the updated FDE software; determine, by the updated pre-boot compatibility verification component of the updated FDE software, a compatibility of the boot disk with the updated FDE software without decrypting and encrypting the boot disk of the computer by the updated FDE software; if the boot disk is determined to be compatible with the updated FDE software, authenticate a computer user and booting the operating system of the computer; and unblock one or more operations of the updated FDE software on the boot drive of the computer.

In yet another exemplary aspect, a non-transitory computer readable medium storing computer executable instructions for updating FDE software on a computer, includes instructions for: blocking operations of the FDE software on a boot drive of the computer; installing one or more components of the updated FDE software on the computer; deploying an updated pre-boot compatibility verification component of updated FDE software that checks compat-
ibility of the boot disk with the updated FDE software; rebooting the computer and executing, before booting of an operating system, the updated pre-boot compatibility verification component of the updated FDE software; determining, by the updated pre-boot compatibility verification component of the updated FDE software, a compatibility of the boot disk with the updated FDE software without decrypting and encrypting the boot disk of the computer by the updated FDE software; if the boot disk is determined to be compatible with the updated FDE software, authenticating a computer user and booting the operating system of the computer; and unblocking one or more operations of the updated FDE software on the boot drive of the computer.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product of updating full disk encryption (FDE) software on a computer. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
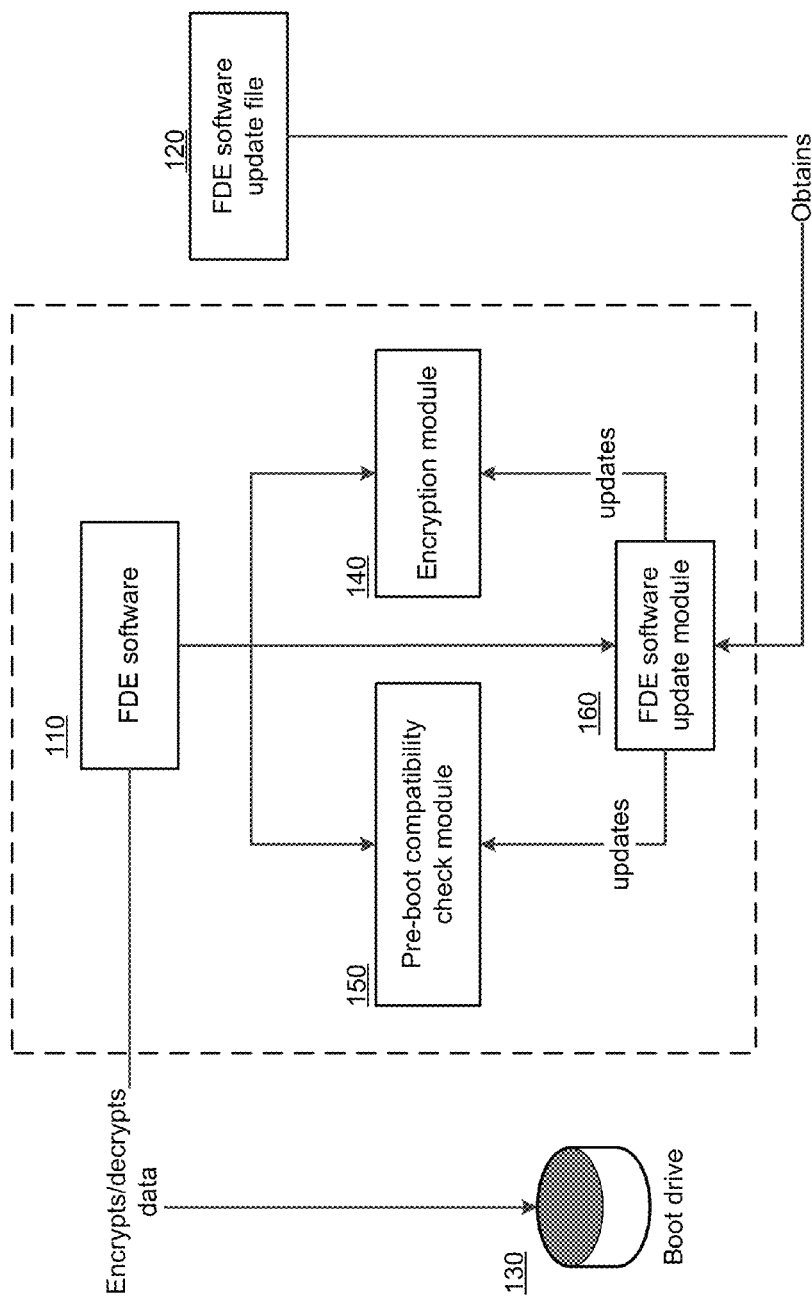
FIG. 1 illustrates an exemplary system of installing an update of FDE software.

FIG. 1 shows an exemplary system of installing an update of FDE software. As shown, the FDE software 110 consists of an encryption module 140, a FDE software update module 160 and a pre-boot compatibility check module 150, whose operating principle is described in detail in a commonly owned U.S. Pat. No. 9,003,176, which is incorporated by reference herein.

In one example, the pre-boot compatibility check module 150 includes the functionality of an authentication means, while in "test" mode the module 150 performs a compatibility check and an authentication, while in "normal" mode it only performs an authentication. When the encryption module 140 uses full disk encryption, the process of booting the computer may be modified to enable the starting of the pre-boot compatibility check module 150, which checks the compatibility of the boot drive 130 with the full disk encryption software 110.

In a general case, the update of the full disk encryption software 110 contains updated versions of the components of the full disk encryption software. The update can be obtained in the form of one file or several files by the means of the FDE software update module 160.

In the case when it is necessary to install the update of the FDE software 110, the system decrypts all the data of the boot drive 130 using the encryption module 140, updates components (e.g., files, registry branches of the operating system, settings, etc.) of the encryption module 140, alters the process of booting of the computer to allow for the starting of the new version of the pre-boot compatibility check module 150 of the boot drive with the FDE software 110, and performs a FDE of the boot drive 130 using the encryption module 140.

Figure 2A:
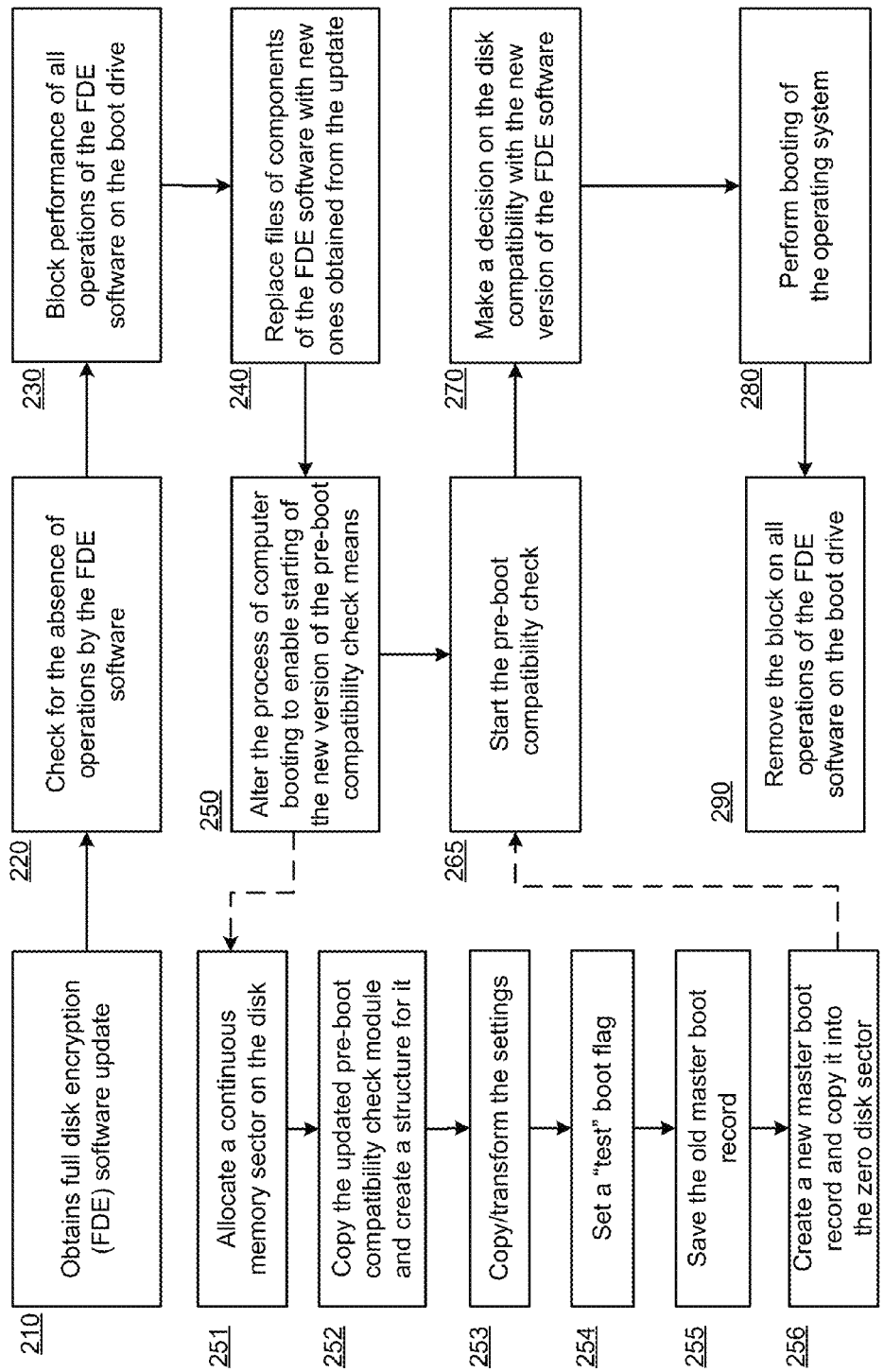
FIG. 2A illustrates an exemplary method of installing an update of FDE software.

FIG. 2A illustrates an exemplary method of installing an update of FDE software. In the initial step 210, an update of the full disk encryption software is obtained by the FDE software update module 160. The update of the FDE software 110 can be obtained in the form of one or several files: on a portable drive; from a local area network server; and from the Internet.

Next, in step 220, the installation of the update of the FDE software 110 begins, during which a check is made for the absence of operations being performed by the FDE software 110 on the boot drive. Operations being performed by the full disk encryption module may include, but not limited to, performing an encryption or decryption by the encryption module 140.

Next, in step 230, the performance of all operations of the FDE software 110 on the boot drive 130 is blocked.

Next, in step 240, the components of the FDE software 110 are replaced by new ones obtained from the update. The components of the FDE software 110 might be: an executable file, a dynamic library, a driver, and a file containing resources used by the FDE software 110.

In one exemplary aspect, the drivers may be replaced by updated ones and then started. In another exemplary aspect, a replacement of the files of the FDE software 110 is added to the operating system boot schedule.

Next, in step 250, the process of booting the computer is altered to allow for the starting of the new version of the pre-boot compatibility check module 150 of the boot drive 130 with the new version of the FDE software 110. In one exemplary aspect, the process may be altered as follows: in step 251, a continuous section of memory may be allocated on the boot drive 130; in step 252, the new version of the pre-boot compatibility check module 150 is copied to the continuous section of memory on the boot drive 130 and a structure is created in this memory section, for storing the settings of the pre-boot compatibility check module 150, for the new version of the pre-boot compatibility check module 150; in step 253, the settings (e.g., user authentication data which is used for subsequent decryption of data on the disk and booting of the operating system; flags used by the pre-boot compatibility check module 150 and keyboard layouts; localized user help resources, and so on) are copied, transforming them if necessary, from the structure for the current (old) version of the pre-boot compatibility check module 150 to the structure for the new version of the pre-boot compatibility check module 150; in step 254, a flag is set in the structure for the new version of the pre-boot compatibility check module 150 that the subsequent rebooting should be a "test" boot; in step 255, the master boot record (MBR) from the current version of the pre-boot compatibility check module 150 is saved in the structure for the new version of the pre-boot compatibility check module 150; and, in step 256, the master boot record is created for the new version of the pre-boot compatibility check module 150 and copied into the zero sector of the disk.

After performing all of the above operations, it can be considered that the new version of the pre-boot compatibility check module 150 has been installed on the disk, and that it will be started if a reboot is performed.

In one exemplary aspect, the current version of the pre-boot compatibility check module 150 is not removed in order to afford the possibility of canceling (e.g., rolling back) the update in the event of discovering an incompatibility of the boot drive 130 with the new version of the FDE software 110.

In one exemplary aspect, a rebooting is performed to start the new version of the pre-boot compatibility check module 150.

After starting, the new version of the pre-boot compatibility check module 150 determines from the flag, which was set that it is a "test" mode.

Next, in step 265, the new version of the pre-boot compatibility check module 150 is used to perform a check of the compatibility of the disk with the new version of the FDE software 110 without decryption and repeated encryption of the data.

Next, in step 270, after performing the check, a decision is made as to the compatibility of the disk with the new version of the FDE software 110.

In the general case, the boot drive 130 is considered compatible with the new version of the full disk encryption module 110 if all the following conditions are fulfilled: a positive outcome for the hardware compatibility of the disk with the computer hardware; a positive outcome of the transformation of the user authentication data, compatible with the current version of the pre-boot compatibility check module 150, into authentication data compatible with the new version of the pre-boot compatibility check module 150; disk complies with the encryption policies; and disk complies with the security policies.

In one exemplary aspect, a check can be performed for the condition of the disk (for example, the S.M.A.R.T. readings or the operating time for a solid state drive) and for the compatibility of the boot drive 130 with the computer hardware (for example, after applying full disk encryption the computer BIOS might be updated, which requires another check for compatibility upon updating of the FDE software 110). It should be mentioned that, in a particular case, the data on the disk might have been previously encrypted (for example, several months ago), and the encryption policies have been changed since then. Therefore, in another exemplary aspect, a check can be performed for the compliance of the disk with the encryption policies which are installed for the FDE software 110 being updated (for example, do not encrypt disks larger than 500 Gb, not to encrypt disks on which the free space is less than 1 Gb, do not encrypt disks which are part of a RAID array, and so on). Also, the security policies may have been changed after the encryption of the data on the disk, therefore a check can be made for compliance of the disk with the security policies (for example, not to encrypt disks of the computers of a particular network segment).

Next, in step 280, a user authentication and booting of the operating system may be performed. In the general case, if the operating system was booted after the user authentication, it is considered that the new version of the pre-boot compatibility check module 150 was successfully installed.

Next, in step 290, the blocking of all operations of the FDE software 110 on the boot drive 130 is removed. After booting the operating system, the encryption module 140 removes the old version of the pre-boot compatibility check module 150. The encryption module 140 also removes the "test" mode flag. After this, the installation of the update of the FDE software 110 is considered to be successfully completed.

Figure 2B:
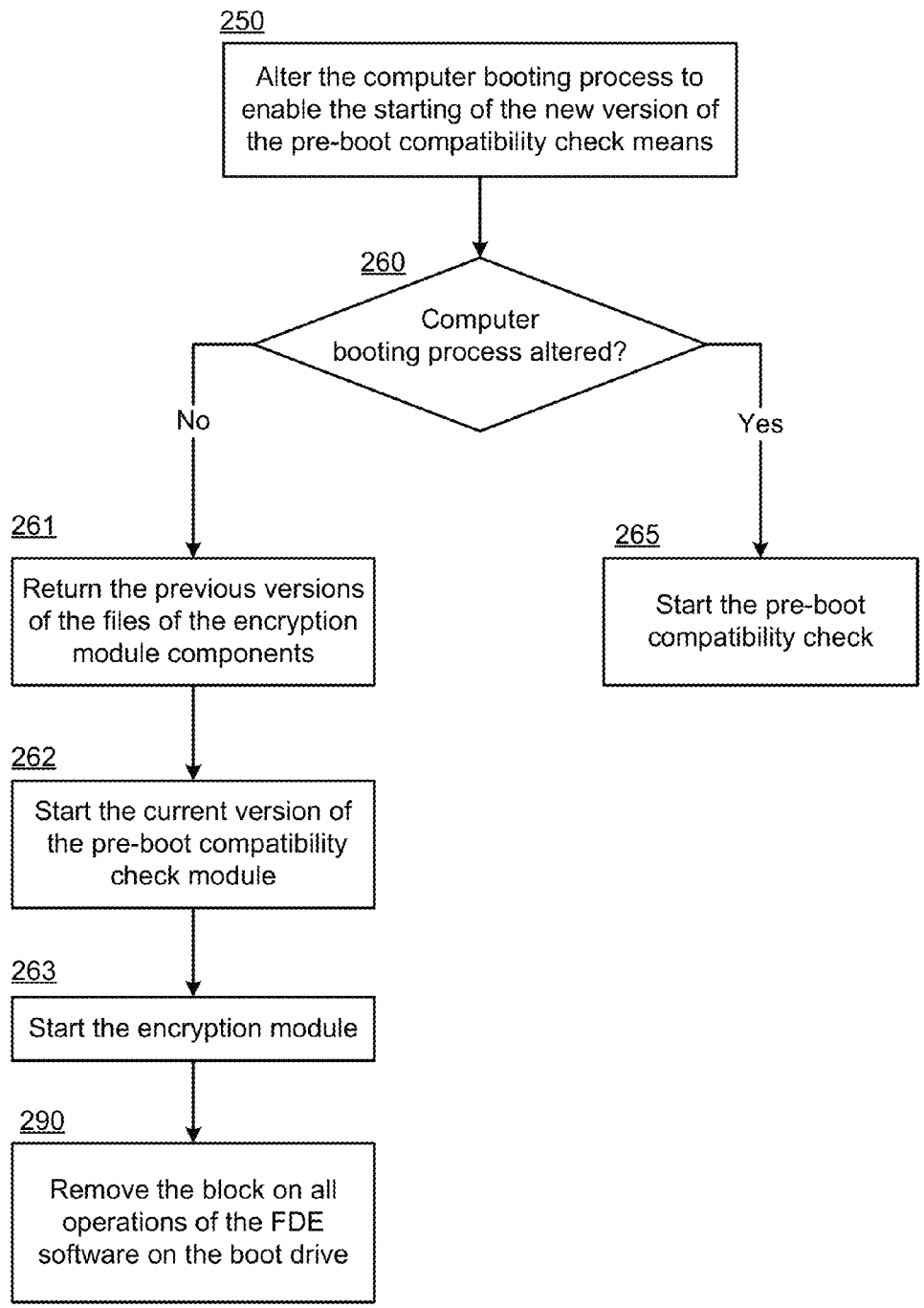
FIG. 2B illustrates an exemplary method for canceling the update of FDE software if it is not possible to load the new version of the pre-boot compatibility check module.

FIG. 2B shows an exemplary method for canceling the update of FDE software if it is not possible to load a new version of the pre-boot compatibility check module. If, in step 250, the process of booting of the computer was not altered to allow for the starting of the new version of the pre-boot compatibility check module 150 of the boot drive with the new version of the FDE software 110 (e.g., an error occurred in one of the steps 251-256), then, in step 260, it is necessary to cancel (rollback) the update in order to restore the working capacity of the FDE software 110. In step 261, the old versions of the files of the components of the encryption module 110 are returned. In one exemplary aspect, the drivers making up the encryption module 110 may be replaced by the old versions, and they will be started. In another exemplary aspect, the replacement of the already updated files of the FDE software 110 with their old versions is added to the operating system boot schedule. Next, in step 262, the old version of the pre-boot compatibility check module 150 is started (for example, by rebooting the computer). Next, in step 263, the encryption module 140 is started. The encryption module 140 discovers (for example, from the versions of the files of the components of the FDE software) that a cancellation of the update has occurred, and, in step 290, it removes the block on the operations of the FDE software 110 and operates in normal mode.

Figure 2C:
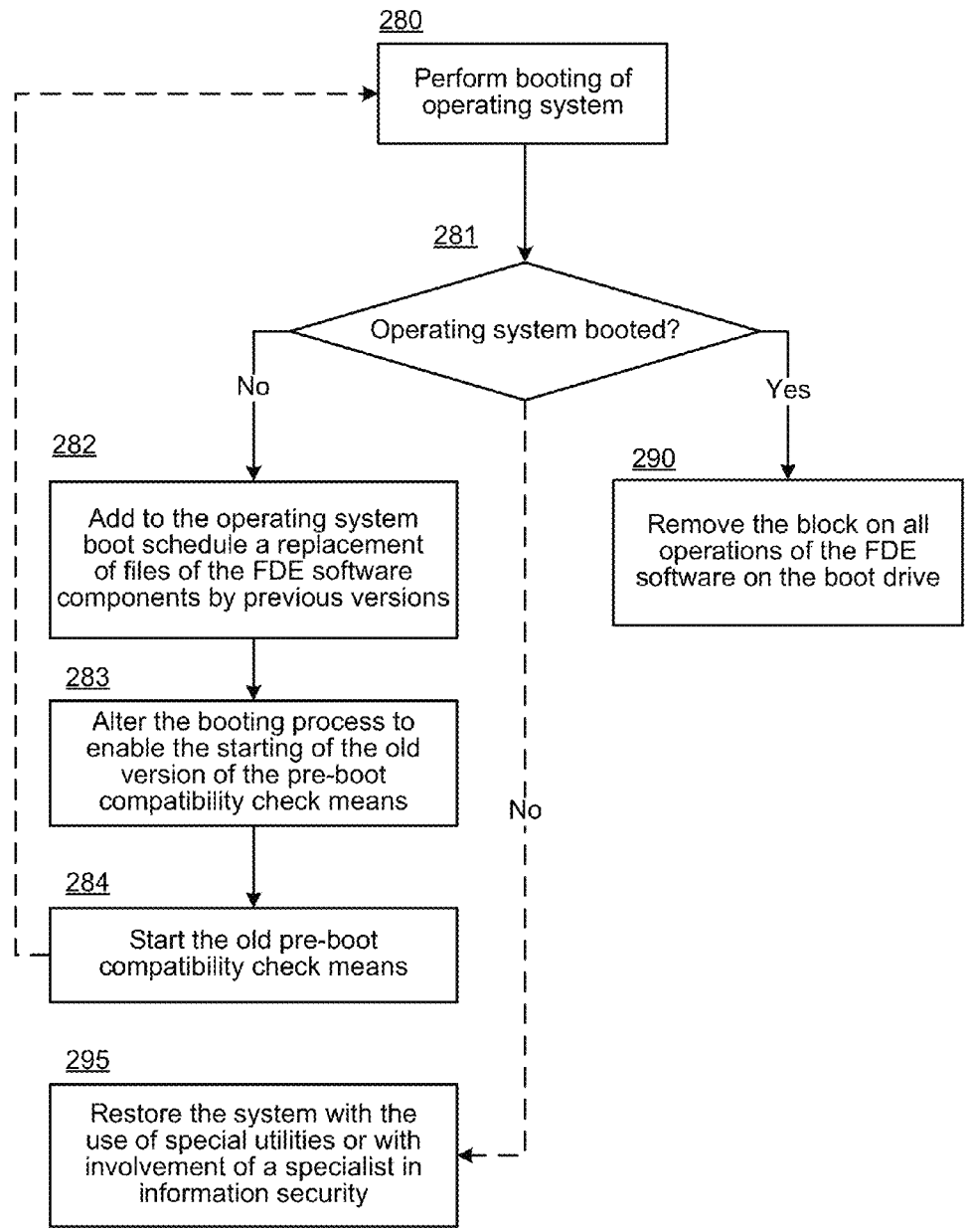
FIG. 2C illustrates an exemplary method for canceling the update of FDE software if it is not possible to start the operating system after the updating of the FDE software.

FIG. 2C shows an exemplary method for canceling the update of FDE software if it is not possible to start the operating system after the updating of the FDE software. If, in step 281, the booting of the operating system did not occur, the update of the FDE software 110 is considered to be incompatible. In the event of an unsuccessful booting of the operating system, the pre-boot compatibility check module 150 in step 282 adds to the operating system boot schedule a replacement of the files of the components of the FDE software 110 by the old (previous) ones, corresponding to the FDE software 110 prior to the update. Next, in step 283, the new version of the pre-boot compatibility check module 150 alters the process of booting the computer to allow for the starting of the old version of the pre-boot compatibility check module 150 of the boot drive 130, corresponding to the old version of the FDE software 110. For this, it copies the master boot record from the old version of the pre-boot compatibility check module 150 into the zero sector of the disk. Next, in step 284, a booting of the old version of the pre-boot compatibility check module 150 is performed (for example, by rebooting). Next, in step 281, the operating system is booted. In step 290, the encryption module 140 discovers that a cancellation of the update has occurred, removes the block on operations of the FDE software 110 and operates in normal mode. The new version of the pre-boot compatibility check module 150 and the structure with its data is removed from the disk. If the system cannot be started, in step 295, a system restoration is performed with the use of utilities designed to restore the operating system boot process, or with the involvement of a specialist in information security.

Figure 3:
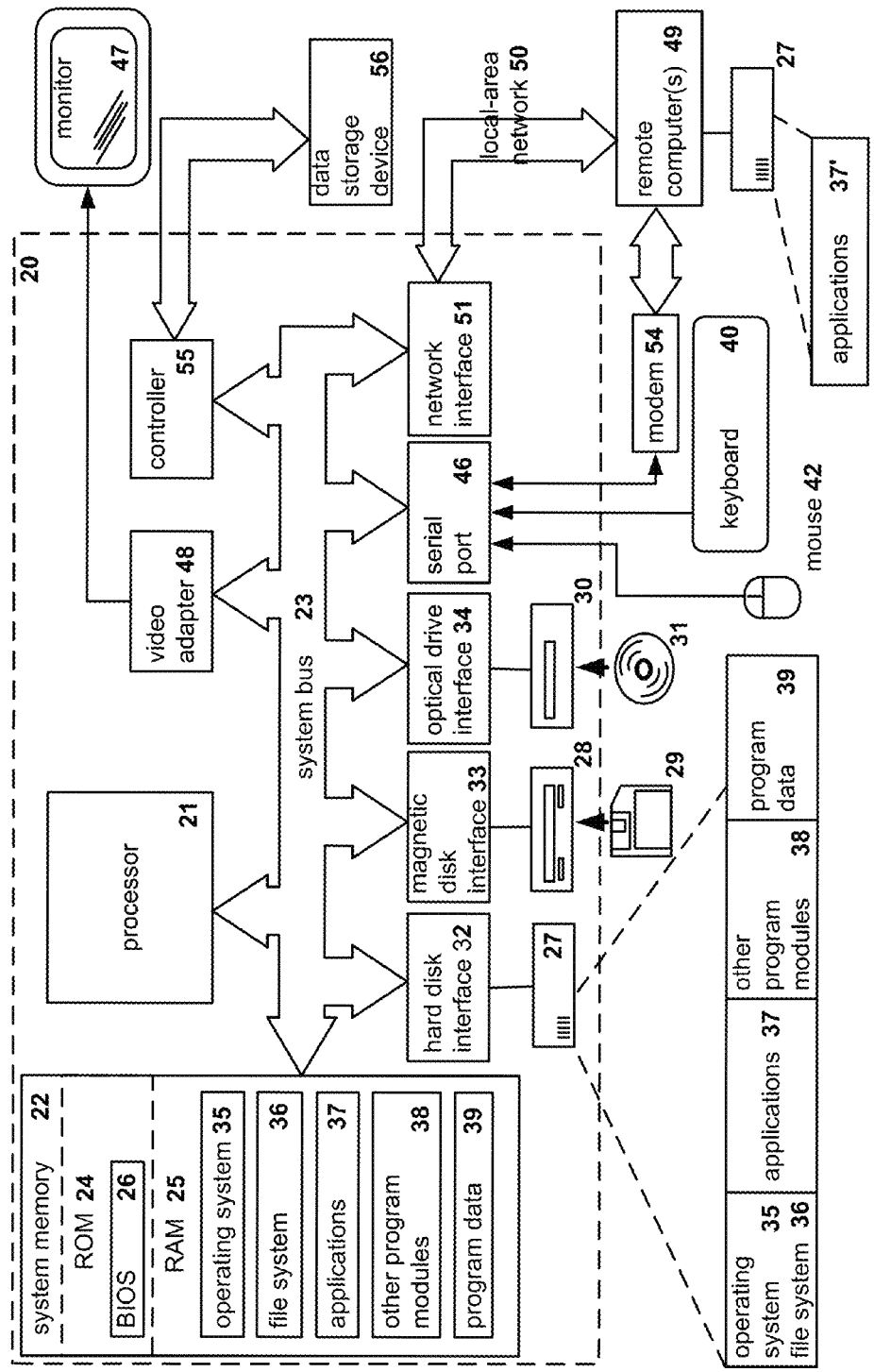
FIG. 3 illustrates an example of a general-purpose computer system on which the aspects of the systems and methods for updating FDE software can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for updating full disk encryption (FDE) software on a computer, comprising:
   blocking operations of the FDE software on a boot drive of the computer;
   installing one or more components of the updated FDE software on the computer;
   deploying an updated pre-boot compatibility verification component of updated FDE software that checks compatibility of the boot disk with the updated FDE software;
   rebooting the computer and executing, before booting of an operating system, the updated pre-boot compatibility verification component of the updated FDE software;
   determining, by the updated pre-boot compatibility verification component of the updated FDE software, a compatibility of the boot disk with the updated FDE software without decrypting and encrypting the boot disk of the computer by the updated FDE software;
   if the boot disk is determined to be compatible with the updated FDE software, authenticating a computer user and booting the operating system of the computer; and
   unblocking one or more operations of the updated FDE software on the boot drive of the computer.

2. The method of claim 1, wherein blocking operations of the FDE software include:
   blocking operations of encrypting the boot drive of the computer; and
   blocking operations of decrypting the boot drive of the computer.

3. The method of claim 1, wherein installing one or more components of the updated FDE software further include installing one or more of: an executable file of the updated FDE software, a dynamic link library of the updated FDE software, a driver of the updated FDE software, and one or more resource files of the updated FDE software.

4. The method of claim 1, wherein deploying an updated pre-boot compatibility verification component of updated FDE software, includes one or more of:
   allocating a continuous block of storage on the boot disk of the computer;
   copying to the allocated block of storage the updated pre-boot compatibility verification component of the updated FDE software;
   creating in the allocated block of storage a data structure for storing one or more settings of the updated pre-boot compatibility verification component of the updated FDE software;
   copying into to the data structure settings of a current FDE software;

setting in the data structure a test reboot flag indicating that the next computer reboot is to be performed in a test mode without decrypting and encrypting the boot disk;
storing in the data structure a copy of a master boot record of the current FDE software;
creating a new master boot record for the updated pre-boot compatibility verification component of the updated FDE software and copying the new master boot record in a zero sector of the boot disk.

5. The method of claim 4, wherein the settings of the current FDE software include at least user authentication data used for decryption of the boot disk.

6. The method of claim 4, wherein, during execution, the updated pre-boot compatibility verification component of the updated FDE software checks settings of a test reboot flag in the data structure in order to perform reboot without decrypting and encrypting the boot disk.

7. The method of claim 1, wherein determining a compatibility of the boot disk with the updated FDE software further includes one or more of:
determining hardware compatibility of the boot disk with the hardware of the computer;
determining transformation of a user authentication data compatible with a current FDE software into a user authentication data compatible with the updated FDE software;
determining compliance of the boot disk with encryption policies of the updated FDE software; and
determining compliance of the boot disk with security policies of the updated FDE software.

8. The method of claim 1 further comprising:
in case of a failure to load the updated pre-boot compatibility verification component,
uninstalling the one or more components of the updated FDE software; and
unblocking operations of the FDE software on the computer.

9. The method of claim 1 further comprising:
in case of a failure to boot the operating system of the computer after installing the one or more components of the updated FDE software on the computer,
adding to the booting schedule replacement of one or more components of the FDE software with components of old FDE software;
modifying the boot process of the computer to assure loading of components of old FDE software;
rebooting the computer, executing a pre-boot compatibility verification component of the old FDE software, and booting the operating system;
unblocking operations of the old FDE software on the computer.

10. A system for updating full disk encryption (FDE) software on a computer, comprising:
a hardware processor configured to:
block operations of the FDE software on a boot drive of the computer;
install one or more components of the updated FDE software on the computer;
deploy an updated pre-boot compatibility verification component of updated FDE software that checks compatibility of the boot disk with the updated FDE software;
reboot the computer and executing, before booting of an operating system, the updated pre-boot compatibility verification component of the updated FDE software;

determine, by the updated pre-boot compatibility verification component of the updated FDE software, a compatibility of the boot disk with the updated FDE software without decrypting and encrypting the boot disk of the computer by the updated FDE software;
if the boot disk is determined to be compatible with the updated FDE software, authenticate a computer user and booting the operating system of the computer; and
unblock one or more operations of the updated FDE software on the boot drive of the computer.

11. The system of claim 10, wherein blocking operations of the FDE software include:
blocking operations of encrypting the boot drive of the computer; and
blocking operations of decrypting the boot drive of the computer.

12. The system of claim 10, wherein installing one or more components of the updated FDE software further include installing one or more of: an executable file of the updated FDE software, a dynamic link library of the updated FDE software, a driver of the updated FDE software, and one or more resource files of the updated FDE software.

13. The system of claim 10, wherein deploying an updated pre-boot compatibility verification component of updated FDE software, includes one or more of:
allocating a continuous block of storage on the boot disk of the computer;
copying to the allocated block of storage the updated pre-boot compatibility verification component of the updated FDE software;
creating in the allocated block of storage a data structure for storing setting of the updated pre-boot compatibility verification component of the updated FDE software;
copying into to the data structure settings of a current FDE software;
setting in the data structure a test reboot flag indicating that the next computer reboot is to be performed in a test mode without decrypting and encrypting the boot disk;
storing in the data structure a copy of a master boot record of the current FDE software;
creating a new master boot record for the updated pre-boot compatibility verification component of the updated FDE software and copying the new master boot record in a zero sector of the boot disk.

14. The system of claim 13, wherein the settings of the current FDE software include at least user authentication data used for decryption of the boot disk.

15. The system of claim 13, wherein, during execution, the updated pre-boot compatibility verification component of the updated FDE software checks settings of a test reboot flag in the data structure in order to perform reboot without decrypting and encrypting the boot disk.

16. The system of claim 10, wherein determining a compatibility of the boot disk with the updated FDE software further includes one or more of:
determining hardware compatibility of the boot disk with the hardware of the computer;
determining transformation of a user authentication data compatible with a current FDE software into a user authentication data compatible with the updated FDE software;
determining compliance of the boot disk with encryption policies of the updated FDE software; and
determining compliance of the boot disk with security policies of the updated FDE software.

17. The system of claim 10, wherein the processor further configured to:
- in case of a failure to load the updated pre-boot compatibility verification component,
  - uninstall the one or more components of the updated FDE software; and
  - unblock operations of the FDE software on the computer.

18. The system of claim 10, wherein the processor further configured to:
- in case of a failure to boot the operating system of the computer after installing the one or more components of the updated FDE software on the computer,
  - add to the booting schedule replacement of one or more components of the FDE software with components of old FDE software;
  - modify the boot process of the computer to assure loading of components of old FDE software;
  - reboot the computer, executing a pre-boot compatibility verification component of the old FDE software, and booting the operating system;
  - unblock operations of the old FDE software on the computer.

19. A non-transitory computer readable medium storing computer executable instructions for updating full disk encryption (FDE) software on a computer, including instructions for:
- blocking operations of the FDE software on a boot drive of the computer;
- installing one or more components of the updated FDE software on the computer;
- deploying an updated pre-boot compatibility verification component of updated FDE software that checks compatibility of the boot disk with the updated FDE software;
- rebooting the computer and executing, before booting of an operating system, the updated pre-boot compatibility verification component of the updated FDE software;
- determining, by the updated pre-boot compatibility verification component of the updated FDE software, a compatibility of the boot disk with the updated FDE software without decrypting and encrypting the boot disk of the computer by the updated FDE software;
- if the boot disk is determined to be compatible with the updated FDE software, authenticating a computer user and booting the operating system of the computer; and
- unblocking one or more operations of the updated FDE software on the boot drive of the computer.

20. The non-transitory computer readable medium of claim 19, wherein blocking operations of the FDE software include:
- blocking operations of encrypting the boot drive of the computer; and
- blocking operations of decrypting the boot drive of the computer.

* * * * *